United States Patent Office 3,520,917
Patented July 21, 1970

3,520,917
PROCESS FOR THE PREPARATION OF CRYSTALLINE N$^\alpha$-CARBOBENZOXY-N$^G$-TOSYL-L-ARGININE
Choh Hao Li and Janakiraman Ramachandran, Berkeley, Calif., assignors to The Regents of the University of California
No Drawing. Filed Nov. 12, 1963, Ser. No. 323,137
Int. Cl. C07c *143/84*
U.S. Cl. 260—470          2 Claims

ABSTRACT OF THE DISCLOSURE

Crystalline arginine derivatives including N$^\alpha$-carbobenzoxy-N$^G$-tosyl - L - arginine, cyclohexylamine salt of N$^\alpha$ - carbobenzoxy - N$^G$ - tosyl-L-arginine, N$^G$-tosyl-L-arginine, N$^\alpha$-t-butyloxycarbonyl-N$^G$-tosyl-L-arginine, and the benzyl ester of N$^G$-tosyl-L-arginine which are useful in the synthesis of peptides and polypeptides.

---

The present invention relates to a novel process for the production of novel organic compounds and, more particularly, relates to a novel process for the production of novel crystalline arginine derivatives including:

N$^\alpha$-carbobenzoxy-N$^G$-tosyl-L-arginine

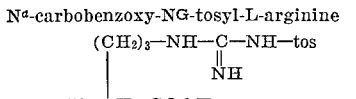

Z—NH—CH—COOH     (I)

Cyclohexylamine salt of N$^\alpha$-carbobenzoxy-N$^G$-tosyl-L-arginine

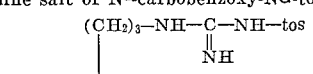

Z—NH—CH—COOH·C$_6$H$_{11}$NH$_2$     (II)

N$^G$-tosyl-L-arginine

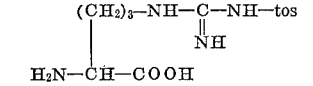

H$_2$N—CH—COOH     (III)

N$^\alpha$-t-butyloxycarbonyl-N$^G$-tosyl-L-arginine

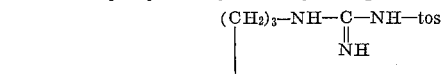

(CH$_3$)$_3$—C—O—CO—NH—CH—COOH     (IV)

Benzyl ester of N$^G$-tosyl-L-arginine

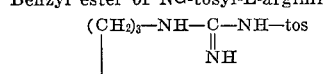

H$_2$N—CH—COO—CH$_2$—C$_6$H$_5$     V

In the above formulae Z represents carbobenzoxy

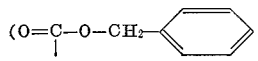

as an α-amino protective group and tos represents tosyl

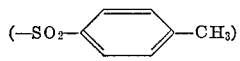

as the guanidino protective radical. In Compound IV, the α-amino radical is protected by a t - butoxy - carbonyl radical.

In the preparation of peptides and polypeptides, it is particularly advantageous to utilize crystalline amino acid derivatives since the crystalline product can be further recrystallized to a greater degree of purity in contrast to amorphous materials. However, the preparation of crystalline arginine derivatives has proven to be unusually difficult (Li et al., J. Amer. Chem. Soc. 83, 4451, 1961; Schnabel et al., J. Amer. Chem. Soc. 82, 4576, 1960). Schnabel et al. indicate that all attempts to crystallize N$^\alpha$-carbobenzoxy-N$^G$-tosyl-L-arginine failed. British Pat. 927,177 discloses the preparation of N$^\alpha$-carbobenzoxy-N$^G$-tosyl-L-arginine and N$^G$-tosyl-L-arginine hydrochloride and hydrobromide as glassy substances.

Since arginine is a key component of many biologically active peptides and polypeptides, the importance of crystalline arginine derivatives is readily apparent. Thus, Li et al., supra, discloses the preparation of a biologically active nonadecapeptide utilizing N$^\alpha$ - carbobenzoxy-N$^G$-tosyl-L-arginine as a key intermediate. Li et al., J. Amer. Chem. Soc. 84, 2460, 1962, also discloses the synthesis of a heptadecapeptide possessing melanotropic and lipolytic activities which synthesis requires N$^\alpha$-carbobenzoxy-N$^G$-tosyl-L-arginine and N$^G$-tosyl-L-arginine benzyl ester as intermediates. Guttman et al., Helv. Chim. Acta, 45, 170, 1962, discloses the use of N$^\alpha$-carbobenzoxy-N$^G$-tosyl-L-arginine in the synthesis of bradykinin.

It has now been found in accordance with the process of the present invention that the novel crystalline N$^\alpha$-carbobenzoxy-N$^G$-tosyl-L - arginine can be obtained by seeding a solution of N$^\alpha$-carbobenzoxy-N$^G$-tosyl-L-arginine, prepared by dissolving the amorphous product in an inert organic solvent, e.g., methanol, acetonitrile, tetrahydrofuran, ethyl acetate, and the like, with ethyl acetate being preferred, with seed crystals of N$^\alpha$ - t - butyloxycarbonyl-N$^G$-tosyl-L-arginine (IV), and then scratching and refrigerating at a temperature of between about 5–20° C., preferably about 5° C., to induce crystallization of N$^\alpha$-carbobenzoxy-N$^G$-tosyl-L-arginine.

It has been further found in accordance with the novel process of the present invention that the novel crystalline N$^\alpha$-t-butyloxycarbonyl-N$^G$-tosyl - L - arginine can be prepared by reacting N$^G$-tosyl-L-arginine with t-butyloxycarbonyl azide. The reaction is carried out in the presence of an inert organic solvent, e.g., tetrahydrofuran, dioxane, and the like, with dioxane being preferred, at a temperature between about 30 and about 60° C., with 45 to 50° C. being preferred, and also in the presence of an alkaline reagent, e.g., magnesium oxide, calcium oxide, barium hydroxide, and the like.

The N$^G$-tosyl-L-arginine utilized in the production of the crystalline N$^\alpha$-t-butyloxycarbonyl-N$^G$-tosyl-L-arginine can be prepared by cleaving the carbobenzoxy radical from N$^\alpha$-carbobenzoxy-N$^G$-tosyl-L-arginine. The removal of the carbobenzoxy radical is preferably carried out by catalytic hydrogenolysis utilizing a palladium catalyst such as palladium-barium sulfate, palladium - charcoal, palladium black, and the like. The hydrogenolysis can be carried out in the presence of an inert organic solvent, e.g., dimethylformamide, tetrahydrofuran, dioxane, methanol, and the like, with methanol being preferred.

In the process discussed above, the α-amino substituent is protected by carbobenzoxy or t-butyloxycarbonyl radicals and the guanidino radical is protected by tosyl. The utilization of the carbobenzoxy, tosyl, and t-butoxycarbonyl protective radicals in the preparation of the novel crystalline compounds of the present invention presents advantages which are not aavilable with other protective radicals. Thus, e.g., the carbobenzoxy protective groups in Compound I can be selectively removed by catalytic hydrogenolysis without the risk of also eliminating the tosyl group. This is one known disadvantage of utilizing a nitro group as a guanidino protective group (British Pat. 927,177). Additionally, the use of nitro as a protective group invariably results in the production of a variety of products during the hydrogenation step to remove the nitro group which raises the additional problems of separation and purification (Paul et al., J. Org. Chem. 26, 3348, 1961; Bodansky et al., Chem. Ind. 1268, 1960).

Subsequent to the obtention of crystalline N$^\alpha$-carbobenzoxy-N-$^G$-tosyl-L-arginine by the novel process of the present invention it was found that the desired crystalline product could be obtained without producing the $N^\alpha$-t-butyloxycarbonyl-$N^G$-tosyl-L-arginine intermediate. Seed crystals permeated the atmosphere and thus resulted more readily in the production of crystalline $N^\alpha$-carbobenzoxy-$N^G$-tosyl-L-arginine. If crystalline material was not obtained through air permeation, then seed crystals of $N^\alpha$-carbobenzoxy-$N^G$-tosyl-L-arginine could be added directly to a solution of $N^\alpha$-carbobenzoxy-$N^G$-tosyl-L-arginine derived from amorphous material whereupon removal of the organic solvent resulted in the production of crystalline material. It was found particularly advantageous, however, in the production of crystalline $N^\alpha$-carbobenzoxy - $N^G$ - tosyl - L - arginine from the amorphous material to convert the amorphous product to the crystalline cyclohexylamine salt thereof (II) and then acidifying the salt to product crystalline $N^\alpha$-carbobenzoxy-$N^G$-tosyl-L-arginine. In the event that the crystalline $N^\alpha$-carbobenzoxy-$N^G$-tosyl - L - arginine does not readily separate from the reaction mixture, then seeding with $N^\alpha$-carbobenzoxy-$N^G$-tosyl-L-arginine seed crystals, as noted above, will induce crystallization. Utilizing the cyclohexylamine salt as an intermediate is particularly desirable since it permits initial purification of the amorphous material and thus increases the ease and rate of crystallization.

The crystalline $N^G$-tosyl-L-arginine benzyl ester (V) was produced by reacting crystalline $N^G$-tosyl-L-arginine with benzyl alcohol saturated with dry hydrogen chloride at temperatures of between about 15° C. and 40° C., with about 25° C. being preferred, and basifying the resulting $N^G$-tosyl-L-arginine benzyl ester hydrochloride with an alkaline agent such as sodium carbonate, potassium carbonate, sodium bicarbonate, and the like.

The following examples are illustrative of the process and products of the present invention but are not to be construed as limiting.

EXAMPLE 1.—CRYSTALLINE $N^\alpha$-CARBOBENZ-OXY-$N^G$-TOSYL-L-ARGININE (A) $N^G$-tosyl-L-arginine $N^\alpha$-carbobenzoxy - $N^G$-tosyl - L - arginine (9.25 g., 20 mmoles) was dissolved in 100 cc. of methanol and hydrogenated in the presence of palladium freshly prepared from 1 g. of palladium chloride and stirred. When carbon dioxide evolution stopped, the solution was filtered from the catalyst, the catalyst was washed with methanol, and the combined filtrates were evaporated to dryness. When the residue was dissolved in 80 cc. of hot water and filtered, crystals of $N^G$-tosyl-L-arginine began to form. After the filtrate had been kept for 16 hours at 25° C., the crystals were filtered and dried. The product, $N^G$-tosyl-L-arginine, weighed 5.6 g. (85.3%), and melted between 146–150° C.; $[\alpha]_D^{25°}$ −5.5° (c.=1.3 in methanol); $[\alpha]_D^{25°}$ +5° (c.=2 in dimethyl-formamide); $R_f$ value=0.43 in paper chromatography in the BAW system (butanol+glacial acetic acid+water) (ninhydrin, chlorine positive; Sakaguchi negative).

*Analysis.*—Calcd. for $C_{13}H_{20}N_4O_4S$ (328.4) (percent): C, 47.5; H, 6.11; N, 17.1; S, 9.77. Found (percent): C, 47.5; H, 6.18; N, 17.2; S, 10.0

(B) Crystalline $N^\alpha$-t-butyloxycarbonyl-$N^G$-tosyl-L-arginine $N^G$-tosyl-L-arginine (9.85 g., 30 mmoles) was mixed with 2.42 g. (60 mmoles) of magnesium oxide and the mixture was stirred at 45–50° C. for an hour in 200 cc. of 50% aqueous dioxane. t-Butyloxycarbonyl azide (8.6 g., 60 mmoles), freshly prepared from t-butyloxycarbonyl hydrazide (Carpino, J. Amer. Chem. Soc. 82, 2725, 1960) was added and the stirring was continued for 30 hours at 45–50° C. The solution was then diluted with 300 cc. of water, filtered free of traces of insoluble material, and extracted with two 60 cc. portions of ethyl acetate. The aqueous phase was cooled in ice and acidified to pH 4 with ice-cold 10% citric acid. The aqueous solution was saturated with aqueous sodium chloride and extracted with three 150 cc. portions of ethyl acetate. The ethyl acetate extracts were washed with saturated aqueous sodium chloride solution, dried over anhydrous sodium sulfate and evaporated to dryness. The residue was redissolved in 200 cc. of ethyl acetate and crystals then appeared on scratching. The mixture was kept at 4° C. for 24 hours, filtered, and dried to give 11 g. (86%) of $N^\alpha$-t-butyloxycarbonyl-$N^G$-tosyl-L-arginine which melted between 98–99° C. On recrystallization from ethyl acetate, the compound melted between 99–100° C.; $[\alpha]_D^{25°}$ −3.3° (c.=4 in dimethylformamide); $R_f$ value=0.83 in paper chromatography in the BAW system (butanol+glacial acetic acid+water).

*Analysis.*—Calcd. for $C_{18}H_{28}N_4O_6S$ (428.5) (percent): C, 50.5; H, 6.59; N, 13.1; S, 7.48. Found (percent): C, 50.3; H, 6.75; N, 13.0; S, 7.19.

(C) Crystalline $N^\alpha$-carbobenzoxy-$N^G$-tosyl-L-arginine

A few crystals of $N^\alpha$-t-butyloxycarbonyl-$N^G$-tosyl-L-arginine were added to a solution of a small amount of amorphous $N^\alpha$-carbobenzoxy - $N^G$ - tosyl - L - arginine in ethyl acetate. Upon scratching and standing in the refrigerator at 5° C. for 4 hours, crystallization was complete. The crystals of crystalline $N^\alpha$-carbobenzoxy-$N^G$-tosyl-L-arginine were recovered by filtration, washed with ice-cold ethyl acetate and dried. The crystalline product melted between 80–82° C.; $[\alpha]_D^{26°}$ −0.45° (c.=10 in methanol).

EXAMPLE 2.—CRYSTALLINE $N^\alpha$-CARBOBENZ-OXY-$N^G$-TOSYL-L-ARGININE (A) Cyclohexlamine salt of $N^\alpha$-carbobenzoxy-$N^G$-tosyl-L-arginine $N^\alpha$-carbobenzoxy-L-arginine (25 g., 81 mmoles) was suspended in a mixture of 100 cc. of water and 400 cc. of acetone, cooled to 0° C. and stirred vigorously. Sufficient 4 N sodium hydroxide, (precooled to 0° C.) was added to maintain the pH at 11–11.5. The suspension was completely dissolved in 1.5–2 hours. p-Toluenesulfonyl chloride (38 g., 200 mmoles) dissolved in 60 cc. of acetone was added dropwise during a period of 30 minutes. Stirring was continued and the pH was maintained at 11–11.5 by the addition of precooled 4 N sodium hydroxide. The clear solution was stirred at 0° C. for another three hours. The pH was adjusted to 7 with 1 N hydrochloric acid and acetone was then removed under reduced pressure at 25° C. Water (200 cc.) was added to the residual solution and the resulting aqueous solution was extracted with three 150 cc. portions of ether. The aqueous layer was cooled to 0° C. and acidified to pH with 6 N hydrochloric acid. A thick white oil separated. The supernatant was removed, saturated with aqueous sodium chloride, and extracted with three 150 cc. portions of ethyl acetate. The oily residue was dissolved in the combined ethyl acetate extracts and the ethyl acetate layer was washed repeatedly with cold 0.1 N hydrochloric acid until the acid wash gave a negative Sakaguchi test. The organic phase was then washed with water until neutral, dried over anhydrous sodium sulfate and evaporated to dryness under reduced pressure at 25° C. to yield 30 g. of a thick oily residue. The oil was dissolved in 100 cc. of methanol, the solution was cooled to 0° C. and 7 cc. of cyclohexylamine (approximately 70 mmoles) was added. Ether was added until the solution became faintly cloudy, and the solution was cleared by the addition of a few drops of methanol. The cyclohexylamine salt of $N^\alpha$-carbobenzoxy-$N^G$-tosyl-L-arginine began to crystallize on scratching. The salt was filtered after being kept at 4° C. for two days, then washed with ice-cold methanol and dried. The product weighed 22.1 g. (48.6%) and melted between 152–154° C.; $[\alpha]_D^{25}$ ° 6.1° (c.=3.2 in methanol).

*Analysis.*—Calcd. for $C_{27}H_{30}N_5O_6S$ (561.7) (percent): C, 57.7; H, 7.00; N, 12.5; S, 5.71. Found (percent): C, 57.8; H, 6.93; N, 12.5; S, 5.91.

(B) Crystalline $N^\alpha$-carbobenzoxy-$N^G$-tosyl-L-arginine

The cyclohexylamine salt of $N^\alpha$-carbobenzoxy-$N^G$-tosyl-L-arginine (20.7 g., 35 mmoles) was dissolved in 150 cc. of methanol by warming. The solution was cooled in ice and stirred with 30 cc. of 2 N hydrochloric acid (60 mmoles) for one hour. Methanol was then removed under reduced pressure at 20° C. and 200 cc. of water was added. The aqueous solution was then extracted with four 150 cc. portions of ethyl acetate. The ethyl acetate extract was washed with water until neutral, dried over anhydrous sodium sulfate, and evaporated to dryness under reduced pressure. The residue was again dissolved in 150 cc. of warm ethyl acetate and crystallized upon cooling to yield 15.5 g. (95.8% based on the cyclohexylamine salt; overall yield, 46.6%) of crystalline $N^\alpha$-carbobenzoxy-$N^G$-tosyl-L-arginine. The product melted between 86–89° C.; $[\alpha]_D^{25}$ —0.5° (c.=7.5 in methanol); $[\alpha]_D^{25}$ —1.3° (c.=4 in dimethylformamide); $R_f$ value=0.83 in paper chromatography in the BAW system (butanol+glacial acetic acid+water).

Analysis.—Cacl. for $C_{21}H_{26}N_4O_6S$ (462.5) (percent): C, 54.5; H, 5.67; N, 12.1; S, 6.93. Found (percent): C, 54.8; H, 5.91; N, 12.2; S, 6.94.

EXAMPLE 3.—CRYSTALLINE-$N^G$-TOSYL-L-ARGININE BENZYL ESTER

Crystalline $N^G$-tosyl-L-arginine (4.92 g., 15 mmoles) was added to 70 cc. of benzoyl alcohol saturated with dry hydrogen chloride, and stirred at 25° C. The solution was again saturated with dry hydrogen chloride after six hours. The excess hydrogen chloride was removed after 24 hours by means of a water pump and the residual solution was treated with 200 cc. of dry ether. The oily residue was washed twice with ether by decantation. The syrup was then dissolved in 50 cc. of water, the solution was cooled to 0° C. and the pH was brought to 10 with ice-cold 50% potassium carbonate. The benzyl ester was extracted into three 50 cc. portions of ethyl acetate. The organic phase was washed with water, dried over anhydrous sodium sulfate, and evaporated to dryness under reduced pressure at 25° C. The residue was dissolved in 50 cc. of ethyl acetate, and petroleum ether was added until the solution became faintly cloudy. The solution was cleared by the addition of a few drops of ethyl acetate. Crystals appeared on scratching. After they were kept for two days at 4° C., $N^G$-tosyl-L-arginine benzyl ester was isolated in 56% yield (3.5 g.) and melted between 72–73° C. A sample was recrystallized from ethyl acetate-petroleum ether and melted between 74–75° C.; $[\alpha]_D^{25}$ +3.3° (c.=2 in dimethylformamide); $R_f$ value=0.68 in paper chromatography in the BAW system (butanol+glacial acetic acid+water).

Analysis.—Calcd. for $C_{20}H_{26}N_4O_4S$ (418.5) (percent): C, 57.4; H, 6.26; N, 13.4; S, 7.66. Found (percent): C, 57.2; H, 6.44; N, 13.4; S, 7.52.

We claim:
1. A process for the preparation of crystalline $N^\alpha$-carbobenzoxy-$N^G$-tosyl-L-arginine which comprises the steps of removing the carbobenzoxy radical of amorphous $N^\alpha$-carbobenzoxy-$N^G$-tosyl-L-arginine by catalytic hydrogenolysis to produce crystalline $N^G$-tosyl-L-arginine, reacting the crystalline $N^G$-tosyl-L-arginine with t-butyloxy-carbonyl azide to produce crystalline $N^\alpha$-t-butyloxycarbonyl-$N^G$-tosyl-L-arginine, seeding a solution of $N^\alpha$-carbobenzoxy-$N^G$-tosyl-L-arginine with crystals of $N^\alpha$-t-butyloxycarbonyl-$N^G$-tosyl-L-arginine, scratching the mixture, cooling the mixture to the temperature between about 5 and about 20° C., and recovering crystalline $N^\alpha$-carbobenzoxy-$N^G$-tosyl-L-arginine from the mixture.

2. Crystalline $N^\alpha$-carbobenzoxy-$N^G$-tosyl-L-arginine.

References Cited

Bergmann et al.: Jour. Biol. Chem., vol. 127, p. 647, 1939.

Greenstein et al.: Chemistry of the Amino Acids, vol. 2, John Wiley and Sons, New York, 1961, pp. 886–890, 928, 933 and 936.

Li et al.: Jour. Am. Chem. Soc., vol. 84, pp. 2460, 2462, 1967.

Weissberger: Techniques of Organic Chemistry, vol. III, Separation and Purification, Interscience, New York, 1956, pp. 480–482.

Greenstein et al.: Chemistry of the Amino Acids, vol. 2, John Wiley and Sons, New York, 1961, pp. 1187, 1231 and 1232.

Carpino et al.: Jour. Am. Chem. Soc., vol. 81, pp. 955–957, 1959.

Li et al.: II, Nature (London), vol. 182, pp. 1669–1670, 1958.

Ramachandran et al.: J. Organic Chemistry, 27, pp. 4006–9 (1962).

Schnabel et al.: J. American Chemical Society, 82, pp. 4576–8 (1960).

Neurath: The Proteins, vol. I, p. 67 (1963).

Weissberger: Techniques of Org. Chem., vol. 3, pt. 1, pp. 479–483.

Zaoral: Collection Czechoslov. Chem. Comm., v. 26, pp. 2316–31 (1961).

Mahler et al.: Biological Chemistry, 1966, Harper & Row, pp. 65–7.

LORRAINE A. WEINBERGER, Primary Examiner

E. J. GLEIMAN, Assistant Examiner

U.S. Cl. X.R.

260—518